(12) United States Patent
Bryan

(10) Patent No.: US 9,692,856 B2
(45) Date of Patent: Jun. 27, 2017

(54) SYSTEM AND METHOD FOR FILTERING AND ALTERATION OF DIGITAL DATA PACKETS

(75) Inventor: B. David Bryan, Newmarket, NH (US)

(73) Assignee: CA, Inc., New York, NY (US)

( * ) Notice: Subject to any disclaimer, the term of this patent is extended or adjusted under 35 U.S.C. 154(b) by 1016 days.

(21) Appl. No.: 12/180,348

(22) Filed: Jul. 25, 2008

(65) Prior Publication Data

US 2010/0020801 A1    Jan. 28, 2010

(51) Int. Cl.
*H04L 29/06* (2006.01)
*H04L 29/08* (2006.01)

(52) U.S. Cl.
CPC .......... *H04L 69/08* (2013.01); *H04L 67/2842* (2013.01)

(58) Field of Classification Search
USPC ........ 370/290, 291, 484, 392, 394; 375/251, 375/350; 701/100
See application file for complete search history.

(56) References Cited

U.S. PATENT DOCUMENTS

| | | | |
|---|---|---|---|
| 6,161,103 A | 12/2000 | Rauer et al. | |
| 6,212,524 B1 | 4/2001 | Weissman et al. | |
| 6,335,935 B2 | 1/2002 | Kadambi et al. | |
| 6,487,603 B1 | 11/2002 | Schuster et al. | |
| 6,594,653 B2 | 7/2003 | Colby et al. | |
| 6,816,455 B2 | 11/2004 | Goldberg et al. | |
| 6,877,134 B1 | 4/2005 | Fuller et al. | |
| 6,895,471 B1 | 5/2005 | Tse et al. | |
| 7,007,029 B1 | 2/2006 | Chen | |
| 7,031,953 B2 | 4/2006 | Shah et al. | |
| 7,089,266 B2 | 8/2006 | Stolte et al. | |
| 7,116,719 B2 | 10/2006 | Hamery et al. | |
| 7,333,982 B2 | 2/2008 | Bakalash et al. | |
| 2001/0001159 A1* | 5/2001 | Ford | 725/25 |
| 2002/0075852 A1 | 6/2002 | Preiss | |
| 2003/0135857 A1* | 7/2003 | Pendakur et al. | 725/61 |
| 2004/0054683 A1 | 3/2004 | Nishizawa et al. | |
| 2004/0139061 A1 | 7/2004 | Colossi et al. | |
| 2004/0139421 A1* | 7/2004 | Hall | 717/101 |
| 2004/0199517 A1 | 10/2004 | Casati et al. | |
| 2005/0165741 A1 | 7/2005 | Gordon | |
| 2005/0283488 A1 | 12/2005 | Colossi et al. | |
| 2006/0026302 A1* | 2/2006 | Bennett et al. | 709/246 |

(Continued)

FOREIGN PATENT DOCUMENTS

| | | |
|---|---|---|
| EP | 823798 | 2/1998 |
| EP | 1517518 | 3/2005 |
| JP | 09284342 | 10/1997 |

OTHER PUBLICATIONS

Joseph M. Silsby, "System and Method for Aggregating Raw Data into a Star Schema," U.S. Appl. No. 12/180,372, 21 pages, filed Jul. 25, 2008.

(Continued)

*Primary Examiner* — Hassan Phillips
*Assistant Examiner* — Saba Tsegaye
(74) *Attorney, Agent, or Firm* — Baker Botts L.L.P.

(57) ABSTRACT

A method comprises receiving data from a data source and converting the data, in approximately real time, into digital data packets, wherein the data packets have a common format. The method further comprises filtering the data packets using a user-defined metadata schema and storing the filtered data packets into a data storage medium.

24 Claims, 2 Drawing Sheets

(56) References Cited

U.S. PATENT DOCUMENTS

| | | | |
|---|---|---|---|
| 2006/0036637 A1 | 2/2006 | Sayal et al. | |
| 2006/0120283 A1 | 6/2006 | Poetker et al. | |
| 2006/0165375 A1* | 7/2006 | Choi et al. | 386/83 |
| 2006/0209829 A1* | 9/2006 | Lo et al. | 370/392 |
| 2006/0259507 A1 | 11/2006 | Higuchi | |
| 2007/0027860 A1 | 2/2007 | Bestgen et al. | |
| 2007/0162472 A1 | 7/2007 | Wan et al. | |
| 2007/0223481 A1* | 9/2007 | Sivakumar et al. | 370/392 |
| 2007/0233651 A1 | 10/2007 | Deshpande et al. | |
| 2007/0239769 A1 | 10/2007 | Fazal et al. | |
| 2008/0183710 A1* | 7/2008 | Serjeantson et al. | 707/8 |
| 2009/0030883 A1* | 1/2009 | Das et al. | 707/3 |
| 2009/0199230 A1 | 8/2009 | Kumar et al. | 725/32 |
| 2009/0234862 A9* | 9/2009 | Begeja et al. | 707/100 |

OTHER PUBLICATIONS

Utley, C., "Designing the Star Schema Database," Version 1.1, http://ciobriefings.com/Publications/WhiePapers/DesiginingtheStarSchemaDatabase/tabid/ . . . , (Talk given 1999), 16 pages, Jul. 17, 2008.

Li, J., et al., "A Formal Model for the Problem of View Selection for Aggregate Queries,"Operations Research Program, NC State University, Raleigh, http://dbgroup.ncsu.edu/rychirko/Papers/LiACF05.pdf, 14 pages, Sep. 21, 2005.

Joseph M. Silsby, U.S. Appl. No. 12/180,372, Office Action from the U.S. Patent and Trademark Office dated Nov. 26, 2010, Nov. 26, 2010.

Joseph M. Silsby, U.S. Appl. No. 12/180,372, Response to non-final Jul. 8, 2011 Office Action from the US Patent and Trademark Office, mailed Apr. 26, 2011, Apr. 26, 2011.

Joseph M. Silsby, U.S. Appl. No. 12/180,372, Final Office Action from the US Patent and Trademark Office dated Jul. 8, 2011, Jul. 8, 2011.

Joseph M. Silsby, U.S. Appl. No. 12/180,372, Response to final Jul. 8, 2011 Office Action from the US Patent and Trademark Office, mailed Sep. 8, 2011, Sep. 8, 2011.

Joseph M. Silsby, U.S. Appl. No. 12/180,372, RCE and Amendment filed with US Patent and Trademark Office on Oct. 10, 2011, Oct. 10, 2011.

Joseph M. Silsby, U.S. Appl. No. 12/180,372, non-final Office Action from the US Patent and Trademark Office dated Dec. 8, 2011, Dec. 8, 2011.

Joseph M. Silsby, U.S. Appl. No. 12/180,372, Response to non-final Dec. 8, 2011 Office Action from the US Patent and Trademark Office, mailed Mar. 8, 2012, Mar. 8, 2012.

* cited by examiner

SYSTEM AND METHOD FOR FILTERING AND ALTERATION OF DIGITAL DATA PACKETS

RELATED APPLICATIONS

This application is being filed concurrently with U.S. Ser. No. 12/180,372, entitled "System and Method for Aggregating Raw Data into a Star Schema," which is incorporated by reference herein.

TECHNICAL FIELD

The present disclosure relates generally to data filtering, and more particularly to a system and method for filtering and alteration of digital data packets.

BACKGROUND

Data processing generally refers to automated computer processes that convert data into information. Incoming data is often in a raw form, consisting of numbers or characters that may not be of much use to a user. Therefore, in many situations, data processing consists of manipulating the raw data into information that is well-presented and informative to a user. This information may allow for easier analysis and presentation of the resulting information to the user.

SUMMARY OF EXAMPLE EMBODIMENTS

The present disclosure is directed to a system and method for filtering and alteration of digital data packets. The teachings of the present disclosure may allow for more efficient data processing.

In accordance with a particular embodiment of the present disclosure, a method comprises receiving data from a data source and converting the data, in approximately real time, into digital data packets, wherein the data packets have a common format. The method further comprises filtering the data packets using a user-defined metadata schema and storing the filtered data packets into a data storage medium. More specifically, the method may comprise modifying or dropping one or more of the data packets. According to particular embodiments, the method may further comprise generating alerts when certain criteria defined in the metadata schema is detected in the data packets.

In accordance with another aspect of the present invention, a system comprises an interface being operable to receive data from a data source. The system further comprises a processor being operable to convert the data, in approximately real time, into digital data packets having a common format and filter the data packets using a user-defined metadata schema. The system further comprises a data storage medium being operable to store the filtered data.

In accordance with another aspect of the present invention, logic encoded in a computer readable medium is operable, when executed on a processor, to receive data from a data source and convert the data, in approximately real time, into digital data packets, wherein the data packets have a common format. The logic is further operable to filter the data packets using a user-defined metadata schema and store the filtered data packets into a data storage medium.

Technical advantages of particular embodiments of the present disclosure include a method for filtering and alteration of digital data packets. This may allow for more effective filtering of data before data processing occurs, which may improve system response time.

Further technical advantages of particular embodiments include more sophisticated filtering that may include modifying data, dropping data, or generating and sending user alerts.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Data processing is relied upon by many different computer applications to transform incoming raw data into useful information that can be communicated to a user. Systems may often receive large amounts of data for processing that can slow down the system's response time. As some of this information may be either repetitive or unwanted by a user, it may be desirable to filter out some of the data before it is sent for processing.

In accordance with the teaching of the present disclosure, a system and method for filtering and alteration of digital data packets is disclosed. An object of the present disclosure is to provide more efficient and sophisticated filtering that may allow for more efficient data processing.

According to particular embodiments of the present disclosure, a method comprises receiving data from a data source and converting the data, in approximately real time, into digital data packets having a common format. The method further comprises filtering the data packets using a user-defined metadata schema and storing the filtered data packets into a data storage medium.

According to particular embodiments, the method may comprise modifying or dropping one or more of the data packets. According to particular embodiments, the method may further comprise generating alerts when certain criteria defined in the metadata schema is detected in the data packets.

Figure 1:
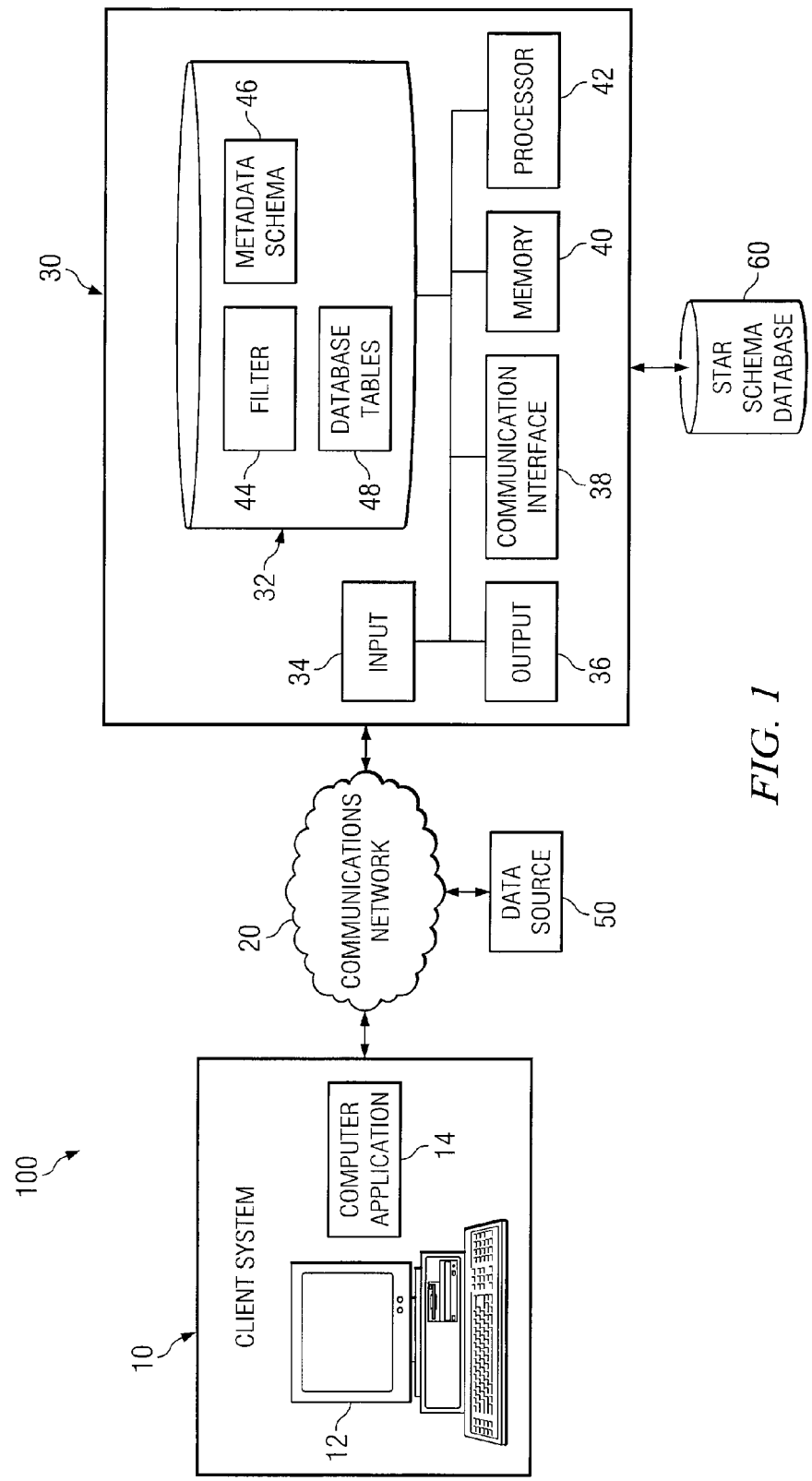
FIG. 1 is a schematic drawing illustrating a computer network configuration suitable for use within particular embodiments of the present invention.

FIG. 1 illustrates a communications system, generally designated by reference numeral 100. Communications system 100 includes client system 10, communications network 20, server 30, data source 50, and star schema database 60.

Client system 10 includes a computer terminal 12, or other medium for accomplishing electronic communication. Terminal 12 may also include specific software, including a browser 14 which allows standardized communication with network server 30. Although the illustrated embodiment depicts client system 10 as a separate element, in alternative embodiments client system 10 may reside locally on server 30.

Server 30 may refer to any device that is operable to deliver information that is sent to the client system 10. According to the illustrated embodiment, server 30 includes storage device 32, an input device 34, an output device 36, a communication interface 38, a memory device 40, and a processor 42.

Input device 34 may refer to any suitable device that is operable to input, select, and/or manipulate various data and information. Input device 34 may include, for example, a keyboard, mouse, graphics tablet, joystick, light pen, microphone, scanner, or other suitable input device.

Output device 36 may refer to any suitable device that is operable for displaying information to a user. Output device 36 may include, for example, a video display, a printer, a plotter, or other suitable output device.

Communication interface 38 may refer to any suitable device that is operable to receive input for server 30, send output from server 30, perform suitable processing of the input or output or both, communicate to other devices, or any combination of the preceding. Communication interface 38 may include appropriate hardware (e.g. modem, network interface card, etc.) and software, including protocol conversion and data processing capabilities, to communicate through a LAN, WAN, or other communication system that allows server 30 to communicate to other devices. Communication interface 38 may include one or more ports, conversion software, or both.

Memory device 40 may refer to any suitable device operable to store and facilitate retrieval of data, and may comprise random access memory (RAM), read only memory (ROM), a magnetic drive, a digital video disk (DVD) drive, removable media storage, any other suitable data storage medium, or a combination of any of the preceding.

Processor 42 may refer to any suitable device operable to execute instructions and manipulate data to perform operations for server 30. Processor 42 may include, for example, any type of central processing unit (CPU).

Storage device 32 may refer to any suitable device operable for storing data and instructions. Storage device 32 may include, for example, a magnetic disk, flash memory, optical disk, or other suitable data storage device. According to the illustrated embodiment, storage device 32 may comprise filter 44, metadata schema 46, and database tables 48.

Filter 44 may comprise any software, hardware, or combination thereof capable of filtering incoming data in accordance with the teachings of the present disclosure. Incoming data may comprise any format of data. According to particular embodiments, the data may comprise digital packets of data. According to the illustrated embodiment, filter 44 is stored within storage device 32. However, according to alternative embodiments, filter 44 may be located on client system 10 or elsewhere on the network.

In general, metadata refers to data about data. A schema may refer to the structure of a database system that is described in formal language supported by a database management system (DBMS). In particular embodiments, such as relational databases, the schema may define the tables, fields within the tables, and the relationships between fields and tables within the database. Accordingly, metadata schema 46 may refer to data describing the tables, fields, and relationships of a database, as well as data that describes the mapping from objects and their properties to the database tables and fields. According to particular embodiments, metadata schema 46 may be user-defined. According to the illustrated embodiment, metadata schema 46 is stored within storage device 32. However, according to alternative embodiments, metadata schema may be located on client system 10 or elsewhere on the network.

Database tables 48 may refer to one or more tables or databases that are capable of storing data. In particular, database tables 48 may store incoming data after it is filtered. Database tables 48 may be generated based on predetermined table names, field names, or other attributes. These values may be stored in user-defined metadata schema 46. According to particular embodiments, database tables 48 may be generated in approximately real time during the filtering process. Although database tables 48 are located in storage device 32 in the illustrated embodiment, they may also be located on client system 10 or elsewhere on the network.

Although filter 44, metadata schema 46, and database tables 48 are illustrated as distinct elements, in alternative embodiments, some or all of these elements may be integrated into a single element.

Star schema is a style of data warehouse schema consisting of fact tables that reference dimension tables. Star schema database 60 may refer to any database conforming to the star schema style. In particular embodiments, the star schema objects stored within star schema database 60 may comprise statistics. In the illustrated embodiment, star schema database 60 is positioned external to server 30. However, according to alternative embodiments, star schema database 60 may be located on client system 10, in storage device 32, or elsewhere on server 30. According to particular embodiments, star schema database 60 may be generated in approximately real time.

Data source 50 may refer to any source of incoming data that will be filtered according to the teachings of the present disclosure. Although data source 50 is illustrated as a distinct element, data for filtering may also reside locally on client system 10 or on server 30.

Figure 2:
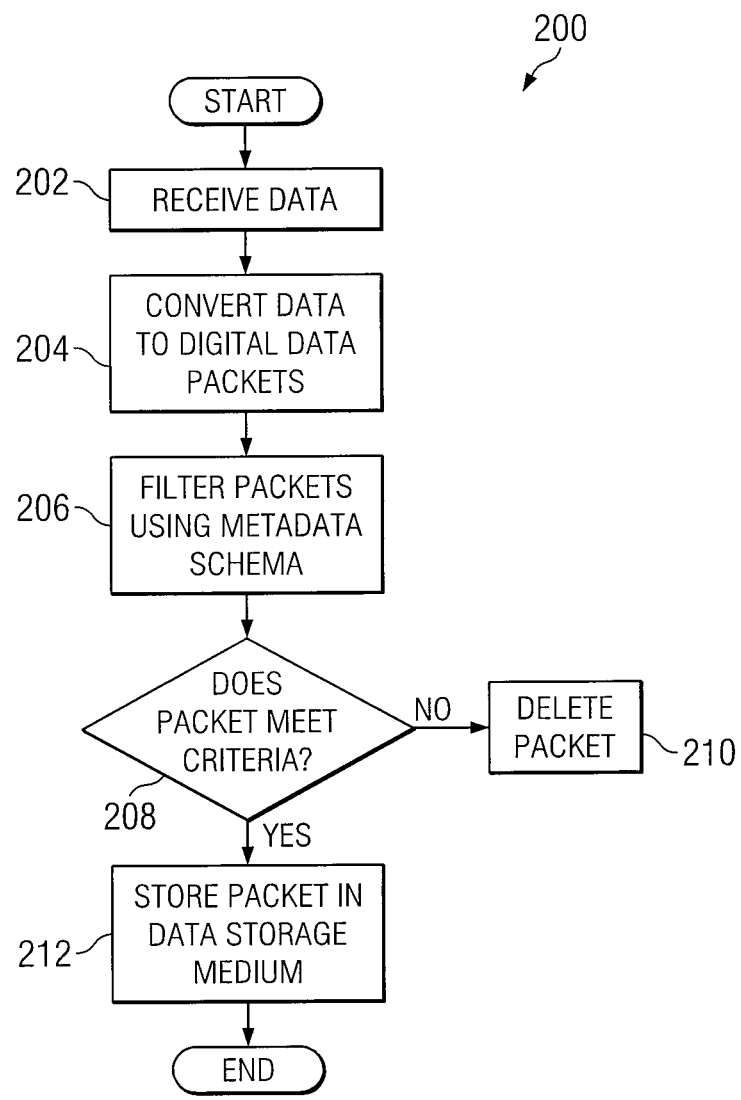
FIG. 2 is a flow diagram illustrating a method for data filtering and alteration, according to particular embodiments of the present disclosure.

FIG. 2 is a flow diagram illustrating a method for data filtering and alteration, according to particular embodiments of the present disclosure. The specific steps of FIG. 2 will be described in detail below with reference to elements illustrated in FIG. 1.

The process begins at step 202, where data is received. This data may be data in any format. According to particular embodiments, this data will be raw or unprocessed data. In many forms, such as binary, this data may not be particularly helpful or understandable by a user in its raw form. The type of data received may vary depending on the application being used. For example, when running a project management application, a user may receive data relating to rule events. This data may include, but is not limited to data regarding when rule processing began, when it completed, and what the process results were. In alternative embodiments, the incoming data may comprise any kind of event notification, with or without corresponding measurement data.

The data may also be received from one or more different sources. According to the illustrated embodiment, this data may come from data source 50, using communications network 20. Data source 50 may be any software, hardware, or combination thereof capable of storing and delivering raw data. Data may also be received from client system 10, server 30, or any other location on a network. According to the illustrated embodiment, this incoming data may be received at server 30. In particular embodiments, this data may be received using communication interface 38.

Depending on the application being used, the amount of data received by the system can be quite large. If all of this data is sent for processing, the system response time to process the data may be increased. Thus, the more information sent for processing, the longer amount of time it would take to process the data and return useful information. In many applications, this slower response time may be undesirable.

In many applications, a user may not want processing to be performed on all incoming raw data. For instance, in some embodiments, information coming into the system may be repetitive or identical to other data already received. In these situations, it may be desirable to process a piece of data once, and not use system resources to process later-received redundant data. Similarly, not all received data may be suitable for processing. For instance, the content of the data may not lend itself to useful information for presentation to a user. Alternatively, the data may lend itself to information for presentation to a user, but a particular user may simply be uninterested in that particular information. In these particular embodiments where processing is either unwanted or unnecessary, filtering this data out could effectively reduce the amount of data sent for processing. This may improve system response time and streamline downstream processing.

As mentioned above, the incoming data may be in a raw form. This may mean that the system may be unable to understand or process the data in this form. Therefore, it may be desirable to convert the raw data to some form that can be understood and processed by the system. According to particular embodiments, this may be accomplished by converting the raw data into digital data packets having a common format, as shown by step 204. This common format may be virtually any data format and may depend on the application being employed. For instance, if an application uses XML, the incoming data may be converted into XML packets. As used herein, "common" means that, although the incoming data may be in various different formats, it will all be converted into digital data packets that share a common format, such as XML.

XML, or Extensible Markup Language, is generally classified as an extensible language that allows users to define their own elements. One of the benefits of XML is that it may facilitate the sharing of structured data across various information systems. XML is commonly used in many data processing applications and may be considered user-friendly. Metadata schema 46 may define how the data is converted into XML packets. For instance, the metadata schema 46 may define dimensions, attributes, and measures corresponding to the data. After being converted, the system may be able to understand the XML data packets for purposes of filtering.

Furthermore, according to particular embodiments, the data may be converted into digital packets in approximately real time. As used in this disclosure, "real time" means that data is converted or filtered as it is received, with little or no buffering.

These converted data packets may then be filtered according to the remaining steps of this disclosure. The conversion of the raw data into digital packets may be accomplished using virtually any computer programming language. According to particular embodiments, Java may be used for this purpose.

After the raw data has been converted into digital packets, these packets may then be filtered, as shown in step 206. This filtering process may be accomplished using filter 44 and metadata schema 46.

As described earlier, metadata schema 46 may refer to data describing the tables, fields, and relationships of a database, as well as data that describes the mapping from objects and their properties to the database tables and fields. According to particular embodiments, metadata schema 46 may be generated at the same time that data is converted into commonly-formatted digital packets. According to alternative embodiments, metadata schema may be created before data is received. Metadata schema 46 may be user-defined. This may allow the user to define the types of information that the user does and does not wish to receive. Metadata schema may also consist of predetermined definitions without any user input. Alternatively, a combination of user-selected and predetermined definitions may be incorporated into metadata schema 46.

In the illustrated embodiment, metadata schema 46 may be stored within storage device 32. In this way, the metadata schema 46 may be made available to multiple users connected to server 30. Alternatively, a single metadata schema 46 may be used for only one user of computer system 12. In these particular embodiments, metadata schema may be located in storage device 32, as pictured, or may alternatively be located on client system 10, for instance in computer system 12.

In particular embodiments, the filtering carried out by filter 44 may comprise simple threshold filtering. This could mean that each packet designated for filtering will be measured against a threshold value to see if the packet is less than, greater than, or equal to that predefined threshold. According to particular embodiments, metadata schema 46 may designate which data packets will be filtered. This may allow for filtering based on different data or different data sources. In particular embodiments, metadata schema 46 may specify that all data packets be filtered. The threshold value may be stored in metadata schema 46. In particular embodiments, this value may be defined by a user. In particular embodiments, the filtering carried out by filter 44 may also be more sophisticated than threshold filtering.

In the illustrated embodiment, filter 44 is pictured as a single element. However, in particular embodiments, filter 44 may actually comprise a plurality of different filters. This may allow more data to be filtered at one time, allowing the system to maintain approximately real time filtering. Additionally, multiple different filters may also be processed sequentially on a given piece of data. This may allow for more sophisticated filtering of the data than would be possible using a single filter.

At step 208, the data is filtered using criteria defined in metadata schema 46. As described above, if threshold filtering is employed, this may comprise comparing the data against a threshold value defined in metadata schema 46. In particular embodiments, more sophisticated filtering may also be employed. This may include, but is not limited to one or more of the following: range filtering, source filtering, process filtering, and compound filtering. Range filtering may be used to determine whether a measurement value is between minimum and maximum values, or if a value falls within a certain time span. In source filtering, the source of the data may be considered. For instance, if the user does not wish to receive data from a given source, source filtering may be used to drop all data received from that particular source. In process filtering, data may be passed to an external process, which may modify the data before returning it. In particular embodiments, this external filtering may be utilized for advanced filtering and may allow for more efficient use of system resources. Finally, compound filtering may use more sophisticated expressions, such as AND, NOT, or OR logical operations, to filter the data. For instance, compound filtering may be used to determine whether a measurement value is within a set of possible values. These various types of filtering are listed for illustrative purposes and are not intended to be an exhaustive list.

Virtually any type of known data filtering may be incorporated into the teachings of the present disclosure.

If the data does not satisfy criteria in metadata schema 46, that data packet may be deleted at step 210. The type of data that may be deleted during the filtering process will depend on the metadata schema. For instance, the metadata schema may be structured such that repetitive data is deleted. Additionally, a user may define the types of data he or she wishes to receive, and data not matching these types may be deleted. Alternatively, data that does not meet certain criteria defined in metadata schema 46 may not always be deleted. In particular embodiments, this data may simply be passed on for storage without processing. For instance, this data may be stored in database tables 48. In particular embodiments, a separate database or other storage device may be employed for this data that will not be processed.

However, if the data packet does meet the criteria defined in metadata schema 46, it may be passed on to a data storage medium, such as database tables 48. In alternative embodiments, the filtered data may be stored on client system 10 or elsewhere on the network. From this point, the filtered data may be available for various data processing.

In particular embodiments, the filtering process according to the present disclosure may simply involve either deleting a packet or storing the packet in a data storage medium. However, in alternative embodiments, additional steps may be included in the filtering process. The inclusion or exclusion of these steps may depend on the criteria defined in metadata schema 46.

For instance, in particular embodiments, filtering may include modifying data before it is sent for storage at step 212. This may allow the incoming data to be changed in approximately real time before it is sent on for processing. According to particular embodiments where the data packets comprise XML packets, when a change is made to the data, the change is actually made to the XML data packet, and not the incoming raw data. In particular embodiments, this modification would normally be performed during the later data processing. By modifying the data before it is processed, this may reduce or even eliminate the need for downstream modification, which may free up resources for more advanced downstream processing.

In specific embodiments, data modification may take the form of table replacement. This allows the incoming data to be replaced with data already existing in a database table, such as tables 48.

The filtering process may also allow for the generation of alerts when certain criteria from the metadata schema 46 is detected in a data packet. In particular embodiments, an alert may comprise a warning indicating that a process is nearing a predefined limit. This limit may be something defined within the system, or it may be user-defined. An alert may also comprise an alarm indicating that a process has exceeded a predefined limit. This alert may be more urgent than a warning, and may indicate to a user that immediate action is required. Other alerts may simply notify a user that some event has occurred, such as the completion of a process. Multiple alerts may be used in conjunction in a single system. The type and number of alerts may vary depending on the application used and the types of information a user wishes to receive.

In particular embodiments, the generation of alerts may occur after filtering steps 208, 210, and 212. As such, certain data packets may have already been filtered out and possibly deleted. This may result in less data to be analyzed for criteria that will generate an alert.

The actual alerts may come in many different forms. These formats may include, but are not limited to database table entries, pop-up messages, e-mails, instant messages, or any other data entry, electronic communication, or combination thereof. In particular embodiments, the alert may simply be stored, for example in database tables 48. In these situations, a user may have to access the storage medium to find the alert. In alternative embodiments, an alert message may be affirmatively communicated to a user. This may be accomplished by sending it to a client system 10 and displaying the alert on computer system 12, possibly using computer application 14.

It should be understood that some of the steps illustrated in FIG. 2 may be combined, modified, or deleted where appropriate, and additional steps may also be added to the flow diagram.

In addition to the advantages enumerated above, various embodiments of the present disclosure provide other benefits. In general, the data filtering method of the present disclosure may allow for the filtering of data based on a user-defined metadata schema. In particular embodiments, this may allow for more customizable and scalable filtering. Additionally, the method may provide for more efficient downstream processing and user-customizable presentation of information. Various other advantages may be readily apparent to one having skill in the art.

Although the present invention has been described in detail, it should be understood that various changes, substitutions, and alterations can be made without departing from the spirit and scope of the invention as defined by the appended claims.

What is claimed is:

1. A method, comprising:
receiving data from a data source;
converting the data using a user-defined metadata schema, in approximately real time, into digital data packets, wherein the data packets have a common format, the common format including elements defined by a markup language;
filtering the data packets using the user-defined metadata schema, the user-defined metadata schema not contained within the received data;
storing the filtered data packets into the database based at least in part on the metadata schema;
wherein the metadata schema defines the elements of the common format of the data packets according to the markup language, the types of data that the user does not wish to receive, one or more tables, one or more fields, and a plurality of relationships between the tables and fields of a database, and a mapping of a plurality of properties of the filtered data packets to the tables and fields of the database; and
wherein filtering the data packets comprises modifying one or more of the data packets.

2. The method of claim 1, wherein filtering the data packets comprises sequentially executing a plurality of filters on the data packets.

3. The method of claim 1, wherein modifying one or more of the data packets comprises replacing a data packet with information from a database table.

4. The method of claim 3, wherein filtering the data packets comprises dropping one or more of the data packets.

5. The method of claim 1, wherein filtering the data packets comprises dropping one or more of the data packets.

6. The method of claim 1, further comprising generating alerts when certain criteria defined in the metadata schema is detected in the data packets.

7. The method of claim 6, wherein generating alerts comprises sending an alert message to a user.

8. The method of claim 1, wherein the markup language is Extensible Markup Language (XML), the data packets are XML data packets, and the elements of the common format of the XML data packets are defined by the metadata schema.

9. A system, comprising:
an interface being operable to receive data from a data source;
a processor being operable to:
convert the data using a user-defined metadata schema, in approximately real time, into digital data packets, wherein the data packets have a common format, the common format including elements defined by a markup language; and
filter the data packets using the user-defined metadata schema, the user-defined metadata schema not contained within the received data;
a data storage medium being operable to store the filtered data in the database based at least in part on the metadata schema;
wherein the metadata schema defines elements of the common format of the data packets according to the markup language, the types of data that the user does not wish to receive, one or more tables, one or more fields, and a plurality of relationships between the tables and fields of a database, and a mapping of a plurality of properties of the filtered data packets to the tables and fields of the database; and
wherein the processor is further operable to modify one or more of the data packets.

10. The system of claim 9, wherein the processor is further operable to sequentially execute a plurality of filters on the data packets.

11. The system of claim 10, wherein the processor is further operable to replace a data packet with information from a database table.

12. The system of claim 9, wherein the processor is further operable to replace a data packet with information from a database table.

13. The system of claim 9, wherein the processor is further operable to drop one or more of the data packets.

14. The system of claim 9, wherein the processor is further operable to generate alerts when certain criteria defined in the metadata schema is detected in the data packets.

15. The system of claim 14, wherein the interface is further operable to send an alert message to a user.

16. The system of claim 9, wherein the markup language is Extensible Markup Language (XML), the data packets are XML data packets, and the elements of the common format of the XML data packets are defined by the metadata schema.

17. A non-transitory computer readable medium comprising logic operable, when executed on a processor, to:
receive data from a data source;
convert the data using a user-defined metadata schema, in approximately real time, into digital data packets, wherein the data packets have a common format, the common format including elements defined by a markup language;
filter the data packets using the user-defined metadata schema, the user-defined metadata schema not contained within the received data;
store the filtered data packets into the database based at least in part on the metadata schema;
wherein the metadata schema defines elements of the common format of the data packets according to the markup language, the types of data that the user does not wish to receive, one or more tables, one or more fields, and a plurality of relationships between the tables and fields of a database, and a mapping of a plurality of properties of the filtered data packets to the tables and fields of the database; and
wherein the logic is further operable to modify one or more of the data packets.

18. The computer readable medium of claim 17, wherein the logic is further operable to sequentially execute a plurality of filters on the data packets.

19. The computer readable medium of claim 17, wherein the logic is further operable to replace a data packet with information from a database table.

20. The computer readable medium of claim 19, wherein the logic is further operable to sequentially execute a plurality of filters on the data packets.

21. The computer readable medium of claim 17, wherein the logic is further operable to drop one or more of the data packets.

22. The computer readable medium of claim 17, wherein the logic is further operable to generate alerts when certain criteria defined in the metadata schema is detected in the data packets.

23. The computer readable medium of claim 22, wherein the logic is further operable to send an alert message to a user.

24. The computer readable medium of claim 17, wherein the markup language is Extensible Markup Language (XML), the data packets are XML data packets, and the elements of the common format of the XML data packets are defined by the metadata schema.

* * * * *